US008516171B2

(12) United States Patent
Anderson et al.

(10) Patent No.: US 8,516,171 B2
(45) Date of Patent: Aug. 20, 2013

(54) SCALABLE, MULTICHANNEL REMOTE DEVICE KVM MANAGEMENT SYSTEM FOR CONVERTING RECEIVED SIGNALS INTO FORMAT SUITABLE FOR TRANSMISSION OVER A COMMAND NETWORK

(75) Inventors: Swen Anderson, Burgstadt (DE); Ronald Wahl, Chemnitz (DE)

(73) Assignee: Raritan Americas Inc., Somerset, NJ (US)

( * ) Notice: Subject to any disclaimer, the term of this patent is extended or adjusted under 35 U.S.C. 154(b) by 1301 days.

(21) Appl. No.: 11/100,346

(22) Filed: Apr. 6, 2005

(65) Prior Publication Data

US 2009/0077280 A1    Mar. 19, 2009

(51) Int. Cl.
*G06F 13/12*    (2006.01)

(52) U.S. Cl.
USPC .......... 710/62; 710/4; 710/5; 710/65; 710/73; 710/316; 709/204; 709/206; 709/223

(58) Field of Classification Search
USPC .................. 710/4, 5, 28, 29, 65, 72, 62, 316, 710/73; 709/223–227, 206, 208
See application file for complete search history.

(56) References Cited

U.S. PATENT DOCUMENTS

| | | | |
|---|---|---|---|
| 5,721,842 A | 2/1998 | Beasley | |
| 5,732,212 A | 3/1998 | Perholtz | |
| 5,884,096 A | 3/1999 | Beasley | |
| 5,937,176 A | 8/1999 | Beasley | |
| 5,978,376 A | 11/1999 | Godse | |
| 6,112,264 A | 8/2000 | Beasley | |
| 6,345,323 B1 | 2/2002 | Beasley | |
| 6,557,170 B1 * | 4/2003 | Wilder et al. | 725/130 |
| 6,560,227 B1 | 5/2003 | Bartoldus | |
| 6,601,101 B1 | 7/2003 | Lee | |
| 6,671,756 B1 * | 12/2003 | Thomas et al. | 710/73 |
| 6,681,250 B1 | 1/2004 | Thomas | |
| 6,725,264 B1 | 4/2004 | Christy | |
| 6,771,213 B2 | 8/2004 | Durst | |
| 6,915,362 B2 | 7/2005 | Ramsey et al. | |
| 6,917,626 B1 | 7/2005 | Duvvury | |
| 7,113,978 B2 | 9/2006 | Beasley | |
| 7,133,393 B2 * | 11/2006 | Ala-Luukko | 370/338 |
| 7,167,923 B2 | 1/2007 | Lo | |
| 7,231,660 B1 | 6/2007 | Daude | |
| 7,441,063 B2 | 10/2008 | Tseng | |

(Continued)

FOREIGN PATENT DOCUMENTS

WO    0205085    1/2002
WO    2007138068    12/2007

OTHER PUBLICATIONS

"Belkin Corporation", "2-Port KVM Switch with Built-In Cabling" User Manual, F1DK102P, Published in 2003, Total Pages: 21.*

(Continued)

*Primary Examiner* — Tammara Peyton (57) ABSTRACT

Disclosed is a remote device management system for managing a plurality of remote devices (i.e., computers, servers, networking equipment, etc.) from one or more user workstations. The present invention discloses a scalable, multi-channel keyboard, video, and mouse (KVM) over Internet Protocol (IP) (KVMoIP) management system. The system can be used in a variety of configurations and is easily tailored to the user's needs. The system also enables a user to remotely manage a variety of devices via a common user interface reached over a single IP address.

7 Claims, 4 Drawing Sheets

(56) References Cited

U.S. PATENT DOCUMENTS

| | | | |
|---|---|---|---|
| 7,519,749 B1* | 4/2009 | Sivertsen | 710/73 |
| 7,554,959 B1 | 6/2009 | Dowling | |
| 7,613,854 B2* | 11/2009 | Chen | 710/62 |
| 7,818,480 B2* | 10/2010 | Hoerl et al. | 710/62 |
| 2002/0087753 A1 | 7/2002 | Beasley | |
| 2002/0097220 A1 | 7/2002 | Ferguson | |
| 2002/0188730 A1 | 12/2002 | Tang | |
| 2002/0188753 A1 | 12/2002 | Tang | |
| 2003/0088655 A1 | 5/2003 | Leigh | |
| 2003/0131127 A1* | 7/2003 | King et al. | 709/238 |
| 2003/0135654 A1 | 7/2003 | Chang | |
| 2003/0210700 A1 | 11/2003 | Chen | |
| 2004/0024851 A1 | 2/2004 | Naidoo et al. | |
| 2004/0064559 A1 | 4/2004 | Kupst | |
| 2005/0033815 A1 | 2/2005 | Nagao | |
| 2005/0044184 A1 | 2/2005 | Thomas | |
| 2005/0044186 A1 | 2/2005 | Petrisor | |
| 2005/0066000 A1* | 3/2005 | Liaw et al. | 709/204 |
| 2005/0125519 A1 | 6/2005 | Yang et al. | |
| 2005/0149738 A1* | 7/2005 | Targosky | 713/182 |
| 2005/0207366 A1 | 9/2005 | Chen | |
| 2005/0235079 A1 | 10/2005 | Chen | |
| 2005/0273312 A1* | 12/2005 | Sandulescu et al. | 703/25 |
| 2005/0289403 A1 | 12/2005 | Rothman | |
| 2006/0002371 A1 | 1/2006 | Chen | |
| 2006/0031488 A1 | 2/2006 | Swales | |
| 2006/0104289 A1* | 5/2006 | Lee | 370/400 |
| 2006/0123182 A1* | 6/2006 | Sandulescu et al. | 710/316 |
| 2007/0002761 A1 | 1/2007 | Diamant | |
| 2007/0165622 A1 | 7/2007 | O'Rourke | |
| 2011/0066773 A1* | 3/2011 | Sivertsen | 710/73 |

OTHER PUBLICATIONS

Trial Transcript, *Apex v. Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket reports in the litigation: *Avocent Redmond Corp.* v. *Raritan Computer, Inc.*, Civil Action No. 1:01-CV-04435(PKC), United States District Court for the Southern District of New York.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Apex et al, Products Brochure, APX 316564-316621.
Apex et al, Products Brochure, APX 316848-316909.
Apex et al, Products Brochure, APX 316910-316969.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.

Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiff's Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
Bellavista et al., How to Support Internet-based Distribution of Video on Demand to Portable Devices, 7 th IEEE Int. Symp. on Computers and Communications (ISCC'02).
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent v. Raritan*, Civil Action No. 4435, Feb. 3, 2005.
Marksman Transcript, *Avocent v. Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.

PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Finlayson et al., "Network Working Group, Requests for Comments: 903, A Reverse Address Resolution Protocol," Computer Science Department, Stanford University, Jun. 1984.
Defendant Raritan Computer Inc.'s Response to Plaintiffs First Set of Post Remand Interrogatory Requirements to Raritan (No. 1R-16R). (Dec. 16, 2004).
The Office Action mailed on Aug. 25, 2009 in the related U.S. Appl. No. 11/341,117.
The Office Action mailed on Apr. 2, 2010 in the related U.S. Appl. No. 11/341,117.
The Office Action mailed on Dec. 21, 2010 in the related U.S. Appl. No. 11/341,117.
The Office Action mailed on Aug. 8, 2011 in the related U.S. Appl. No. 11/341,117.
The extended European Search Report by the European Patent Office, mailed on Apr. 17, 2012, in the corresponding European Application No. EP 06749148.0.
Notice of Allowance, mailed on Apr. 25, 2012, in related U.S. Appl. No. 11/341,117.
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex's Sales Brochure, Sep. 1, 1998, 1 page.
Bergen, II et al., Building an MPI cluste, Crossroads, The ACM Student Magazine, vol. 8, Issue 5, Aug. 2002.
The International Search Report and Written Opinion by the International Searching Authority, issued on Aug. 14, 2006, in the PCT application No. PCT/US06/12281.
The International Search Report and Written Opinion by the International Searching Authority, issued on Oct. 19, 2007, in the PCT application No. PCT/US07/01498.
The Office Action issued on Nov. 14, 2008 in related U.S. Appl. No. 11/341,117.
Notice of Allowance, mailed on Aug. 6, 2012, in related U.S. Appl. No. 11/341,117.

* cited by examiner

SCALABLE, MULTICHANNEL REMOTE DEVICE KVM MANAGEMENT SYSTEM FOR CONVERTING RECEIVED SIGNALS INTO FORMAT SUITABLE FOR TRANSMISSION OVER A COMMAND NETWORK

FIELD OF THE INVENTION

The present invention relates generally to the field of keyboard, video, and mouse (KVM) over Internet Protocol (IP) (KVMoIP). In particular, the present invention relates to a scalable, multi-channel KVMoIP solution. The present invention can be used in a variety of configurations and is easily tailored to the user's needs. It allows a user to remotely manage a variety of devices via a common user interface reached over a single IP address. Further, the present invention provides a variety of functions, inter alia, re-direction of various signals such as video, keyboard, mouse, Universal Serial Bus (USB), and serial signals, IMPI support, and power management.

BACKGROUND OF THE INVENTION

In a typical multiple computer environment, a Local Area Network (LAN) or Wide Area Network (WAN) allows for each computer to be connected to several other computers such that the resources of each connected computer are available to each of the connected computers. In this networked environment, a dedicated keyboard, video monitor, mouse, audio output device, audio input device, and/or auxiliary peripheral devices may be employed for each computer.

Keyboard, video, and mouse (KVM) switches for allowing access and control of multiple remote computers have long been known in the art. Traditional KVM switches use direct point-to-point wiring among servers, switch hardware, and end-user consoles. Recently, KVM devices have begun utilizing Internet Protocol (IP) in order to allow users at a local computer to communicate with and control remote devices. Keyboard, Video, and Mouse over Internet Protocol (KVMoIP) technology utilizes conventional network infrastructures running Transmission Control Protocol/Internet Protocol (TCP/IP) to permit remote access and control of computers and other devices.

KVMoIP devices offer several advantages over traditional KVM switches. In traditional KVM switches, one generally has to run cables from each server to switch chassis, then run more dedicated cables from switch-to-switch, and run still more cables from switches to each end-user console. The cabling is not only costly, but laborious and requires both effort and knowledge in larger systems. Additionally, space becomes a consideration as these systems generally take up a large amount of room. KVMoIP systems offer a simplified solution to this cabling problem. The KVMoIP equipment can be anywhere the computers are, with short cables from the KVMoIP unit to the computers. Only one Category 5 (CAT 5) cable need be run from the KVMoIP unit to an Ethernet hub. This connection can also be done wirelessly, eliminating the need for the CAT 5 cable.

Additionally, KVMoIP systems make it easier to add more computers to the existing network. When computers need to be added, they do not have to be located in the same room or even same building as in analog based KVM equipment. All that is necessary is to plug in the KVMoIP unit into an accessible network. This design eliminates the need for more switch-to-switch wire runs, or other cable extenders.

KVMoIP devices generally connect directly to an IP network via a 10/100 Network Interface Card (NIC). Users accessing the KVMoIP device can select one or more of the switch inputs at any time and a number of independent user sessions are supported. Generally, in traditional KVM switches, only one switch computer can be displayed at any time.

KVMoIP software is also incorporated into the system. KVMoIP software features several methods of accessing a KVMoIP device. Local consoles, dial-up, and serial connections offer a backup. Often proprietary software is implemented within the KVMoIP device. Some other systems known in the art use web browsers, Virtual Network Computing (VNC) clients, etc. to access the KVMoIP devices.

VNC clients are remotely controlled software, which allow a user to view and interact with one computer (the "server") using a simple program (the "viewer") on another computer (the "client machine") anywhere on the Internet. The two computers may use different operating systems. Special software is required on both the remote server and the client machine. Additionally, VNC clients operate on a peer-to-peer basis.

Intelligent Platform Management Interface (IPMI) has further advanced remote computer management over the few years. IPMI was developed as an industry standard allowing administrators or other users to proactively manage, diagnose, and reboot machines from a remote location. When used in conjunction with other management technologies, IPMI provides a valuable and useful addition. IPMI is implemented within a server and is independent of the server's central processing unit (CPU) and operating system (OS) allowing it to work on its own when the host processor is down. IPMI enables, inter alia, management of servers via the network, increased security (i.e., encryption and authentication requirements), serial over LAN (SOL) control, Remote Management Control Protocol Plus (RMCP+), and VLAN control.

The functions enabled through IPMI use can be performed via local management software or remotely from a management station via IPMI management protocol. However, IPMI does not solve every management need. Tasks such as re-directing Graphical User Interface (GUI) screens across a network or reading application data with Simple Network Management Protocol (SNMP) (i.e., a management service that provides information such as the number of requests a particular application has processed in a given time period) still require additional technology. Thus, IPMI should be considered complementary to other management technologies, rather than a replacement.

One KVM system known in the art discloses an extended range communications link for coupling a computer to a keyboard, video monitor, and/or mouse that is located remotely from the computer. The end of the link that is coupled to the computer has a first signal conditioning circuit that conditions the keyboard, video monitor and mouse signals. 'Conditioning the video monitor signals includes reducing their amplitude in order to minimize the amount of "crosstalk" that is induced on the conductors adjacent to the video signal conductors during transmission of the video signals. This signal conditioning circuit is coupled to an extended range cable having a plurality of conductors that transmit the conditioned signals, power, and logic ground potentials to a second signal conditioning network. This second network restores the video signals to their original amplitude.

Another system discloses a communications link for use between a computer and a display unit, such as a video monitor, that allows these two components to be located up to three hundred (300) feet apart. An encoder located at the computer end of the communications link receives analog red, green and blue signals from the computer and inputs each signal to a discrete current amplifier that modulates the signal current. Impedance matching networks then match the impedance of the red, green and blue signals to the impedance of the cable and transmit the signals to discrete emitter-follower transistors located at the video monitor end of the cable. These transistors amplify the signal prior to inputting it to the video monitor. Concurrently, the horizontal synchronization signal is inputted to a cable conductor and its impedance is not matched to the impedance of the cable, thereby allowing the conductor to attenuate the horizontal synchronization signal and reduce noise radiation.

Yet another system discloses an extended range communications link for transmitting transistor-transistor logic video signals from a local computer to a video monitor located up to a thousand feet from the computer. The link includes a first signal conditioning circuit located at the computer end of the link for reducing the amplitude of the video signals received from the computer and biasing them to a selected potential, where after they are applied to discrete conductors of the link. A second signal conditioning circuit receives and reconstructs the transmitted video signals prior to inputting them to the video monitor. According to the system, performance of this process reduces the appearance of high frequency video noise on the keyboard clock conductor of the transmission cable, preventing keyboard errors.

A different system discloses a video signal multiplexing device for use with a single video monitor that is capable of selecting one video signal from a plurality of computers for display on the video monitor. The multiplexing device has three switch circuits, a control signal generating circuit, three voltage amplifying circuits, three current amplifying circuits, a synchronous signal selection circuit and an interface circuit.

Yet another system known in the art discloses a computerized switching system for coupling a user interface, including a keyboard, mouse, and/or video monitor to one of a plurality of remote computers. A first signal conditioning unit, located at the user interface, includes an on-screen programming circuit that comprises a switch, a processor, and memory and is used to overlay a menu of connected computers on the video monitor of the user interface. After a remote computer is chosen from the overlaid menu, the first signal conditioning unit receives keyboard and mouse signals from the local user interface and generates a data packet for transmission to a central cross point switch. This switch routes the data packet to a second signal conditioning unit located at the selected, remote computer. The second signal conditioning unit then inputs the keyboard and mouse commands into the keyboard and mouse connectors of the remote computer as if the local keyboard and mouse are directly coupled to the remote computer. Video signals produced by the remote computer are also transmitted through the cross point switch to the video monitor of the user interface. The horizontal and vertical synchronization video signals are encoded on one of the red, green, or blue video signals to reduce the quantity of cables required to transmit the video signal from the remote computer to the local interface's video monitor.

Still another system discloses a method for accessing, controlling and monitoring data located on a remote computer from a local host computer. The video raster signal at the remote computer is converted to digital form and compressed after it has undergone a cyclic redundancy check. Software located on the host computer is capable of decoding the compressed video information and displaying it to a user of the local host computer. The remote computer and the local host computer may be connected either via the Public Switched Telephone System (PSTN) using modems at either end or via standard cabling. The system is also capable of bi-directionally transmitting mouse and keyboard signals between the host computer and the remote computer.

Still yet another system discloses a video signal distributor that receives, processes, and distributes video signals received from one or more computers to a plurality of video monitors. The video signal distributor includes three transistor-based voltage amplifying circuits to individually amplify the red, green and blue video signals received from each computer prior to transmitting these signals to a video monitor. The video signal distributor also includes a synchronization signal buffering device that receives horizontal and vertical synchronization signals from each computer and generates new synchronization signals based upon the quantity of video signals that are output to the video monitors.

A final system known in the art discloses a system for network switching of computer peripheral data. The system claims essentially unlimited connection of servers to network workstations. It has one or more data converters that convert the keyboard, video and mouse signals into suitable format for transmission between a network of workstations and servers. A plurality of servers communicates over a corporate network (LAN, WAN, etc.). The KVM ports of the various servers are connected with a cable to converter boxes, which communicate with a maintenance network. The system also provides motherboard access to servers. When a user wishes to access a server, a user workstation communicates via the maintenance network with a corresponding converter for the desired server to gain motherboard access to the server. It requires two separate links: one for network access and one for motherboard access.

In view of the foregoing, a need clearly exists for a multichannel, scalable KVMoIP system for remotely managing a plurality of remote devices from a plurality of user workstations. Further, the system should support IPMI, USB, video, keyboard, and mouse re-direction. Also, the system should include IPMI support for both IPMI over serial and IPMI over Ethernet. It should be able to combine various signals into a single communication path for remote device management. Finally, the system should provide power management of the remote devices.

SUMMARY OF THE INVENTION

The present invention discloses a scalable, multi-channel keyboard, video, and mouse (KVM) over Internet Protocol (IP) (KVMoIP) solution. It can also be used in a single, multi-channel KVMoIP system. Additionally, the present invention can be used for building a distributed, non-blocking KVMoIP system. The present invention also supports a variety of interfaces, including, but not limited to, PS/2, video output, USB, serial, and audio. Further, the present invention enables transfer and re-direction of various signals, including, but not limited to, video output, keyboard and mouse, USB device, and audio signals. The signal transfer and redirection preferably operates via a packet switched network.

Additionally, the system provides a cost effective single channel KVMoIP hardware module (KIM). Preferably, one KIM is used per channel to form one KVMoIP port. Since every KVMoIP channel processes it owns remote device, the scalability of the system is improved over a single CPU approach, which has to handle more than one video frame grabber/encoder unit. As the present invention is platform independent, it can simultaneously handle multiple platforms.

A common communication network is then used to connect multiple KIMs together. The common network is preferably a 10/100 Mbit Ethernet network, although it is foreseeable that other communication networks may be utilized without departing from the spirit of the invention. Additionally, software preferably runs every KIM and combines the KIMs into one logical device.

KIMs communicate with each other over the common communication network. The KIMs can be configured in a push, pull, or static configuration. Also, no hierarchy is necessary as all the devices are preferably connected to a single hub. The KIMs preferably share one user database and offer one web-based common user interface that can be reached over a single IP address. That is, the KIMs share access to part or all of the configuration data and the user can easily access the system over a single IP address. For communication between KIMs inside a cluster, the MAC address of each KIM is preferably used to differentiate traffic. It is foreseeable that other address configurations may be also be used without departing from the spirit of the invention.

Each KIM preferably has identical firmware whereby only a single firmware update is required to update all KIMs. The updates are essentially the same as for users using a single KVM switch device. Since every KIM needs the same firmware revision, the present invention distributes the firmware to all the KIMs in the KVMoIP system. When an update fails on a certain KIM, the KIM is preferably isolated and the user is notified. All KIMs in the cluster have the same rights and all share the same distributed database configuration.

The present invention is preferably implemented via software, although a hardware version is foreseeable. Advantageously, a software approach enables a clustering of KIMs to one single "virtual" device. Further, the present invention enables the user to build a distributed KVMoIP switch unit, which is physically based on KVMoIP dongles, but locally managed as a singular unit. A variety of distributed transactions are possible, such as a flat transaction, nested transaction, nested banking transaction, distributed banking transaction, etc. The system needs only one IP address, thus, the system is easily accessible via the common IP address. Also, only one user interface is needed. Therefore, from the user's viewpoint, the set up appears as an "n" port KVMoIP device, where "n" is the number of remote devices. Preferably, a unique computer cluster protocol is implemented to achieve the preceding effect.

There are two types of KVM switch configuration data: node/channel and shared. Node/channel local configuration data is only referenced by the corresponding node. Shared configuration data may be referenced by all nodes of the virtual KVM switch. Since configuration variables are often accessed, it is desirable that such access be fast. Therefore, in the present invention, the operation is preferably local to the node (i.e., local to the KIM). This locality requires each KIM have a copy of all configuration data that is shared between the KIMs. Preferably, each KIM of the KVMoIP system has a consistent view of the configuration data. In order to accomplish this task, preferably a push configuration changes each KIM using transactions.

The present invention requires little to no manual configuration to set up a cluster of KIMs (i.e., the system includes "self organization" functionality). There is only one initial software set up necessary to group the KIMs into one virtual device. The user thus has the advantage of configuring the preferred size of a KVMoIP switch system by simply combining the necessary KIMs with a singular software tool after which the user can access the virtual device. The virtual device preferably incorporates one IP address, one web-based user interface, a singular database with user and password information, device configuration, etc., a flexible amount of CPU ports, and a complete firmware update from only one firmware file. Other security authentication methods such as Radio Frequency Identification (RFID) or a variety of biometric identification devices may be incorporated into the present invention.

Further, KIM modules may be embedded in a server system and multiple servers with embedded KIM technology can form the virtual device. The size of the virtual KVMoIP device can be modified dynamically, both in terms of extension and reduction. Adding or removing KIMs from the cluster requires the use of a cluster configuration utility.

Alternatively, a user may add more KIMs to the cluster without performing any other modification other than the physical connection of the KIM to the system. The only requirement is that the KIM have a common packet network connection, which preferably is an Ethernet based TCP/IP network. However, to one of skill in the art, other network connections are foreseeable.

In order to replace faulty KIMs, the present invention preferably utilizes the cluster configuration utility as the replacement KIMs need to acquire the cluster ID number. However, this replacement does not affect any of the other KIMs in the cluster. Furthermore, the present invention detects failures and problems occurring within the system and provides potential recovery from the failures and problems. Examples of failures and problems include: a partly successful firmware update (i.e., some KIMs updated successfully, while some KIMs failed to update), a mixture of non-consistent versions of KIMs, an isolated KIM crash, failing KIM network interconnects, etc. The problem KIMs are preferably isolated from the system and a notification is sent to the administrator.

Each KIM within the cluster can re-direct any kind of USB device from a user workstation to a remote device. Further, as each KIM includes the same firmware revision, the present invention enables the re-directing of a USB device (i.e., a CD-ROM device) to a plurality of remote devices simultaneously. In this manner, the present invention enables an OS installation on a plurality of remote devices (i.e., a plurality of servers), simultaneously saving both time and effort. Other "bulk" operations are also possible, including, but not limited to, common re-boot of server systems, common software updates, common diagnostic status updates and detection of system status (e.g., over IPMI), and common monitoring. The system enables the user to selectively apply such bulk operations to any combination of remote devices simultaneously. Every KIM provides the same re-direction (video, USB, etc.) performance as would be experienced via a single port KVMoIP device.

Therefore, it is an object of the present invention to provide a distributed KVMoIP system physically based on KVMoIP dongles, but locally managed as a singular unit.

It is also an object of the present invention to use a single IP address for accessing remote devices.

Another object of the present invention is to enable a user web-based access to the system.

Still another object of the present invention is to provide a database for such purposes as user identification, password information, device configuration, etc.

A different object of the present invention is to enable a singular firmware update that updates every KIM.

Yet a different object of the present invention is that each KIM offers the same re-direction performance in comparison to a single port KVMoIP device.

Further, an object of the present invention is to enable bulk operations such as common reboots, software updates, monitoring, etc.

Another object of the present invention is to provide a robust system against breakdowns of portions of the system.

Finally, an object of the present invention is to allow for transmission and re-direction of a variety of signals, inter alia, video, keyboard, mouse, USB, serial, and audio signals.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE DRAWINGS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
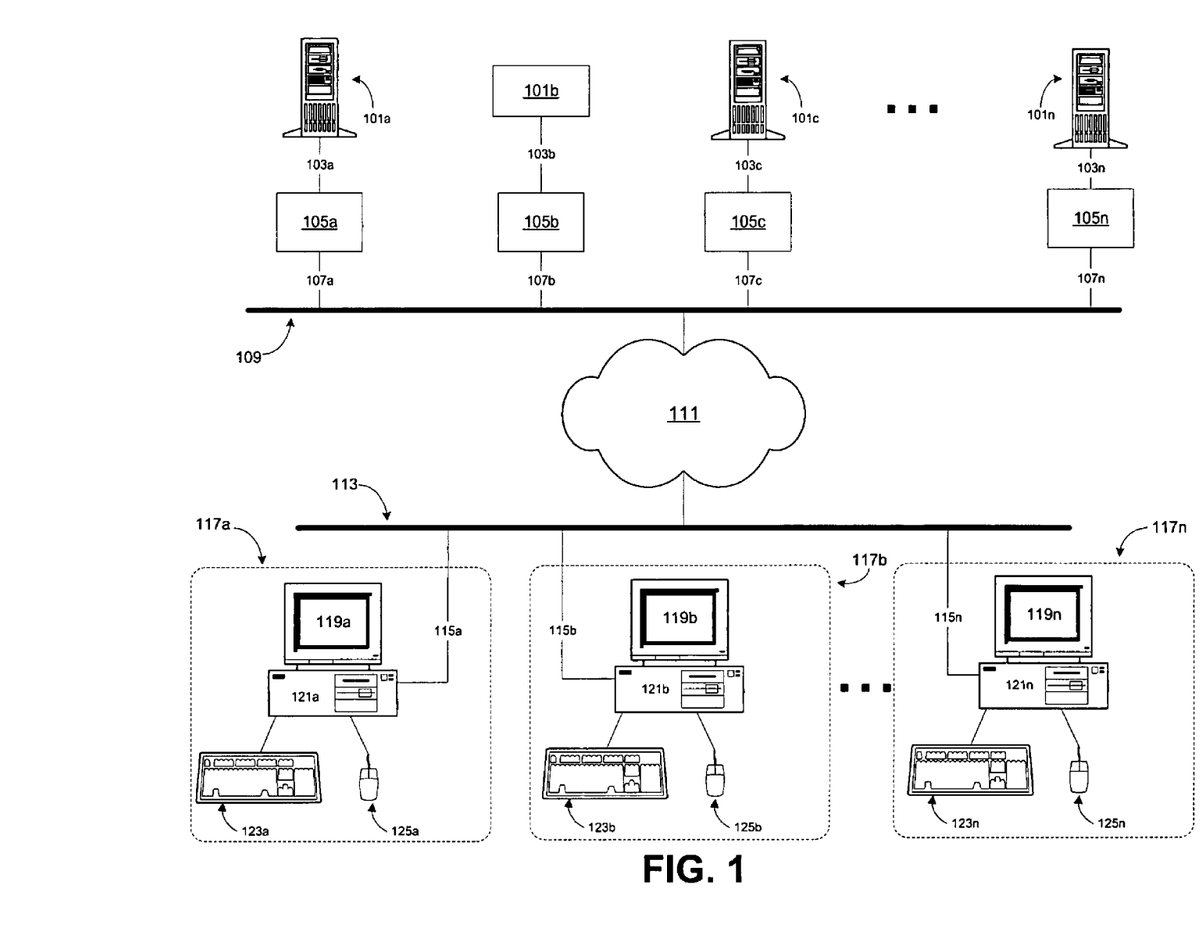
FIG. 1 depicts a block diagram of the preferred embodiment of the remote device management system according to the present invention.

Referring first to FIG. 1, depicted is the preferred embodiment of the remote device management system according to the present invention. Each remote device 101a-n, where "n" is an integer representative of the number of devices, is connected to a KIM 105a-n via connection 103a-n (i.e., remote device 101a is connected to KIM 105a via connection 103a, remote device 101b connects to KIM 105b via connection 103b, etc.) Alternatively, KIMs 105a-n may be internal to remote devices 101a-n. In such a configuration, KIMs 105a-n may be a PCI card connected to a PCI slot within remote devices 101a-n. Advantageously, such a setup would eliminate any issues related to providing power to the KIM.

For simplicity of the drawing, connections 103a-n are shown as a single line connection. However, one of skill in the art will recognize that connections 103a-n may include a plurality of connections such as keyboard, mouse, and video connections as required to remotely manage remote devices 101a-n. These connections may include, but are not limited to, Universal Serial Bus (USB) connections, serial connections, PS/2 connections, various audio and video connections, etc. Also, connection 103a-n may be wireless utilizing a standard wireless networking protocol as known in the art. KIM 105a-n is preferably connected to common communication network 109 via connection 107a-n. Common communication network 109 is preferably a 10/100 Mbit Ethernet network, although it is foreseeable that other communication networks may be utilized. Connection 107a-n preferably is Category 5 (CAT5) cabling. However, it is foreseeable that connection 107a-n may be wireless or other types of cabling. Also, additional equipment required to access the network, such as a hub or gateway (not shown), may be incorporated.

Communications network 109 preferably connects to Internet 111, which further connects to communications network 113. Similar to communications network 109, communications network 113 is preferably a 10/100 Mbit Ethernet network, although it is foreseeable that other communication networks may be utilized. Communications network 113 connects to user computers 121a-n located at user workstations 117a-n via connections 115a-n. User workstation 117a-n preferably comprises monitor 119a-n, computer 121a-n, keyboard 123a-n, and cursor control device 125a-n. User workstation 117a-n may also include other components such audio speakers. Connection 115a-n is preferably CAT5 cabling, although it is foreseeable that connection 115a-n may be wireless or other types of cabling. One of skill in the art will recognize that a router, hub, etc. may be implemented into the system as necessary.

When user at user workstation 117a-n accesses the remote devices 101a-n via a web-based user interface. From this interface, the user is able to manage and control the remote devices. Additionally, via the user interface, the user can initiate the initial setup, update the KIM firmware revisions, perform bulk operations, add or remove KIMs from the cluster, reboot remote devices, etc.

Figure 2:
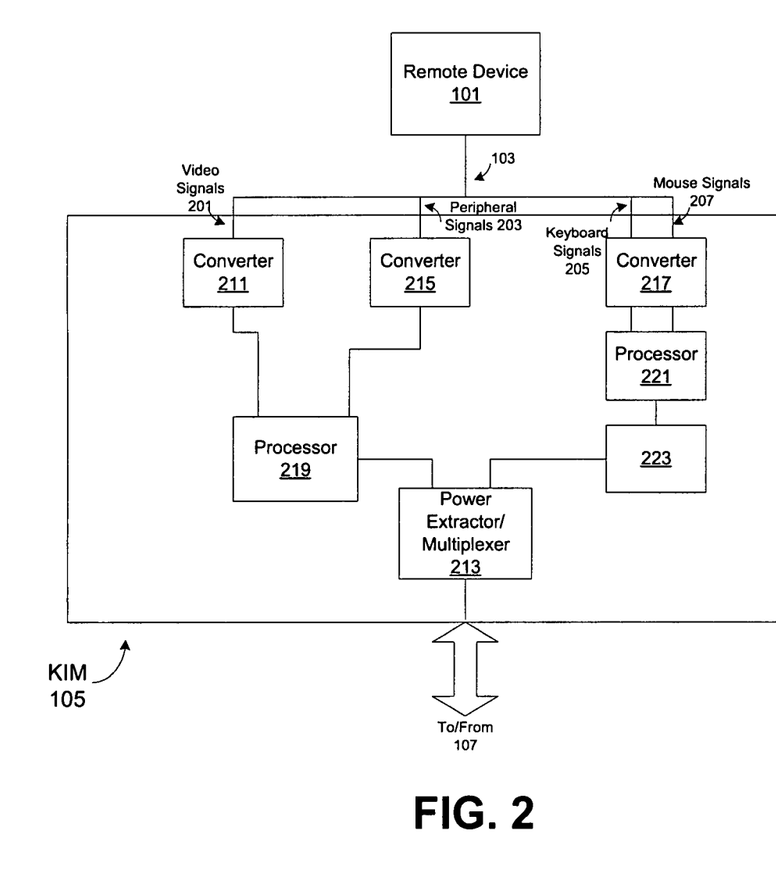
FIG. 2 depicts a block diagram of the preferred embodiment of a single channel KVMoIP hardware module (KIM) according to the present invention.

Turning next to FIG. 2, depicted is a block diagram of the preferred embodiment for KIM 105 according to the present invention. Remote device 101 bi-directionally connects to KIM 105 via connection 103. Connection 103 is shown as a single line connection for simplicity. However, one of skill in the art will recognize that connection 103 can actually comprise several connections including, but not limited to, keyboard, mouse, video, audio and other peripheral device connections. KIM 105 includes the necessary ports depending on the system requirements. For example, if remote device 101 includes a USB keyboard and a USB mouse, KIM 105 would include at least two (2) USB ports. In FIG. 2, connection 103 includes video signals 201, peripheral signals 203, keyboard signals 205, and cursor control device signals 207. Peripheral signals 203 may vary depending on the requirements of remote device 101. For example, peripheral signals 203 may be USB signals or serial signals. Video signals 201 received by KIM 105 initially are sent to converter 211. Converter 211 preferably converts the 5-bit video signal (1 for red, 1 for blue, 1 for green, 1 for horizontal sync, and 1 for vertical sync) into a format suitable for transmission. Converter 211 preferably digitizes video signals 201 as necessary and combines each of the two (2) sync signals onto a separate color for transmission over CAT5 cabling. Converter 211 also applies the proper scaling and resolution. In addition, a known reference signature voltage may be inserted in order to provide automatic gain compensation. The video signals are processed as necessary (i.e., applying the proper protocol, etc.). Peripheral signals 203 received by KIM 105 are sent to converter 215 where the proper protocol is applied and the signals are converted into a format suitable for transmission. Next, the converted video and peripheral signals are sent to processor 219. Processor 219 creates data packets for transmission and further processes the packet as necessary. The data packets are sent to power extractor 213. Power extractor 213 also acts as a multiplexer/demultiplexer. Preferably, KIM 105 extracts power from remote device 101.

The video signals are preferably compressed using a video compression algorithm, such as the one found in U.S. application Ser. No. 10/898,001, incorporated in its entirety herein by reference. As a result of the limited bandwidth over networks, an efficient compression algorithm is vital to ensure minimum latency of video transmissions.

Keyboard signals 205 and cursor control device signals 207 received by KIM 105 are sent to converter 217. Converter 217 applies the appropriate logic signals. The signals are then sent to processor 221 which combines the converted keyboard and cursor control devices signals into a data packet. Next the data packet is sent to interface circuitry 223 where the proper protocol is applied. Preferably, interface circuitry 223 is an RS485 interface. The data packet is then sent to power extractor 213. The packetized data is then sent from KIM 105 to communications network 109 via connection 107. One of skill in the art will recognize that a similar process occurs for signals sent from user workstation 117 to remote device 101. Further, one of skill in the art will recognize that KIM 105 depicted in FIG. 2 is merely an example and that other components not shown may be utilized in place of or in conjunction with any of the shown components.

If connection 103a-n and/or connection 107a-n is wireless, the necessary wireless networking components (not shown) will also be present in KIM 105a-n. For example, KIM 105a-n may include a wireless receiver and transmitter.

Figure 3:
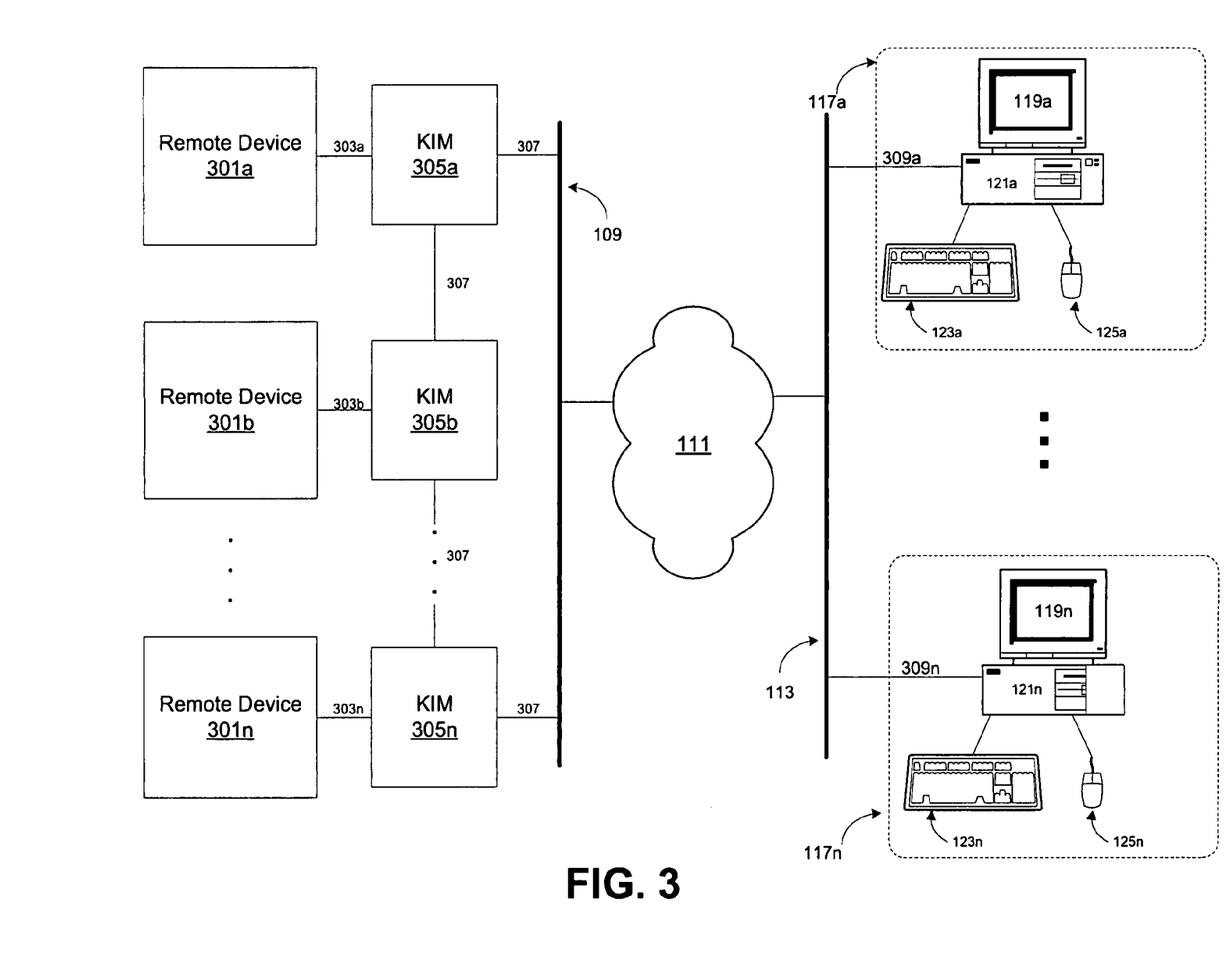
FIG. 3 depicts a block diagram of an alternative embodiment of the remote device management system according to the present invention whereby showing a daisy chain KIM connection.

Next, FIG. 3 shows an alternative embodiment of the present invention depicting a remote device management system wherein the KIMs are daisy chained together. The system depicted in FIG. 3 is the same as that of FIG. 1 except for the daisy connection of KIMs 305a-n. Remote devices 301a-n are connected to KIMs 305a-n via connections 303a-n. KIMs 305a-n are similar to KIMs 105a-n except that they are daisy chained together via connections 307.

Preferably, connections 307 are CAT5 cabling. KIM 305a, the first KIM in the chain, connects to common communication network 109. KIM 309n, the last KIM in the chain, connects either to a terminator or to network 109. KIMs 305a-n preferably extract power from remote devices 301a-n.

Figure 4:
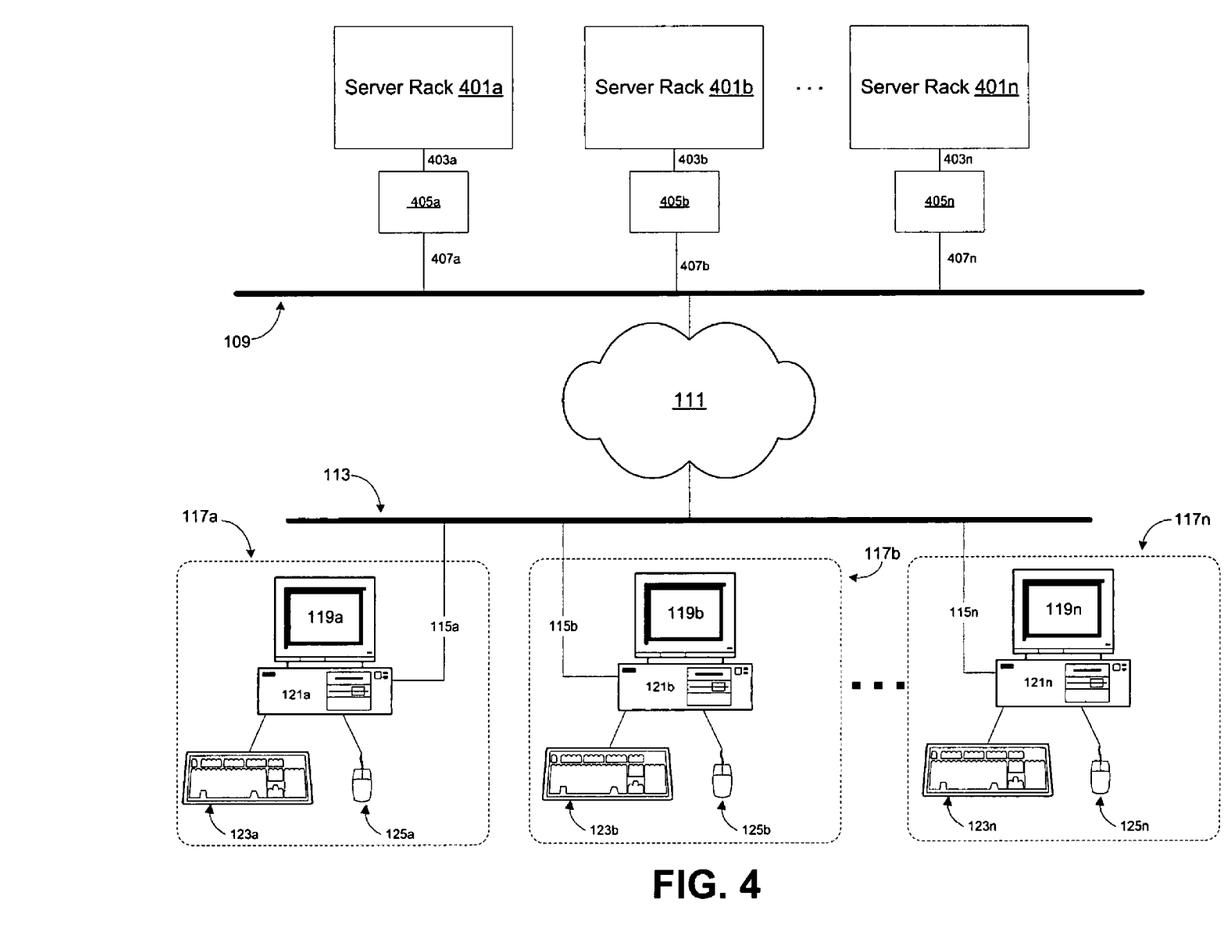
FIG. 4 depicts a block diagram of an alternative embodiment of the remote device management system according to the present invention whereby a combined converter connects to a series of remote devices.

Finally, FIG. 4 depicts yet another alternative embodiment of the present invention whereby a combined converter connects to a series of remote devices. Composite KIM 405a-n is similar to KIM 105, but with increased capabilities (e.g., additional KVM ports). Advantageously, composite KIM 405a-n enables the present invention to connect multiple remote devices 301a-n within server rack 401a-n with minimal hardware. Although shown as a single line connection for simplicity of the drawing, one of skill in the art will recognize that connection 403a-n will include multiple KVM (and other ports as necessary) for connecting each remote device 301a-n to composite KIM 405a-n.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method for remotely managing a plurality of remote devices by bi-directionally communicating information between at least one user workstation and at least two of the plurality of remote devices through respective remote interface modules, wherein said respective remote interface modules communicate via a common communications network with said at least one user workstation, said method comprising the steps of:

receiving a first plurality of signals comprising at least a first, a second and a third signal at one of the respective remote interface modules from its respective remote device;

converting said signals received at said one remote interface module into a format suitable for transmission via the common communications network;

transmitting said converted signals from said one remote interface module to said user workstation via the common communications network;

converting said transmitted first plurality of signals into a format suitable for use at said user workstation; and receiving a second plurality of signals transmitted by said user workstation at each of said respective remote interface modules, the second plurality of signals including signals provided to said user workstation by a USB device in communication with said user workstation and received by said respective remote interface modules for simultaneous application of a bulk operation to said at least two remote devices by said respective remote interface modules.

2. The method according to claim 1, wherein said first plurality of signals include signals selected from the group consisting of video signals, audio signals, and peripheral device signals.

3. The method according to claim 1, wherein said second plurality of signals include signals selected from the group consisting of PS/2 signals, video output signals, USB signals, serial signals, IPMI signals and audio signals.

4. The method according to claim 1, wherein said common communications network comprises the Internet.

5. The method according to claim 4, wherein said signals received at said one remote interface module are converted into a format suitable for transmission via the Internet.

6. A method according to claim 3, wherein the second plurality include PS/2 signals or USB signals selected from the group consisting of keyboard signals and cursor control device signals.

7. The method according to claim 1, wherein the bulk operation is selected from the group consisting of rebooting of remote devices, applying software updates to remote devices, and detecting a diagnostic status of remote devices.

* * * * *